United States Patent [19]
McDonough

[11] 3,777,303
[45] Dec. 4, 1973

[54] HOLE LINER FOR PRINTED CIRCUIT BOARDS

[75] Inventor: Cletus McDonough, Elmhurst, Ill.

[73] Assignee: Molex Incorporated, Downers Grove, Ill.

[22] Filed: Mar. 15, 1972

[21] Appl. No.: 234,958

[52] U.S. Cl. .................. 339/258 R, 29/626, 29/629, 174/68.5, 339/17 C, 339/217 R

[51] Int. Cl. .......................... H01r 11/22, H05k 1/18

[58] Field of Search ................ 174/68.5; 317/101 C, 317/101 CC; 339/17 R, 17 C, 217 R, 217 S, 275 B, 221 R, 258 R, 256 R, 258 RR; 29/629, 626

[56] References Cited

UNITED STATES PATENTS

| | | | |
|---|---|---|---|
| 2,593,479 | 4/1952 | Nieter | 339/17 C |
| 2,877,441 | 3/1959 | Narozny | 339/258 R |
| 2,913,634 | 11/1959 | Scoville | 339/217 S |
| 3,187,298 | 6/1965 | Shannon | 339/17 R X |

*Primary Examiner*—Darrell L. Clay
*Attorney*—Richard D. Mason et al.

[57] ABSTRACT

A hole liner includes a metal body insertable into a hole in a printed circuit board for holding a component lead to be soldered to the board. An upper stop limits insertion, while a resilient latch near the lower end of the body engages the lower surface of the board to prevent withdrawal of the liner. The lower end of the body includes jaws for gripping a component lead inserted into the liner, and at least one of the jaws is connected to the resilient latch. The outer surfaces of the jaws are angled inwardly to aid insertion of the body into the hole, and upon insertion the jaws contract and the latch is resiliently forced inwardly. Upon full insertion the latch moves to its latching position in engagement with the undersurface of the board. The mouth or gap defined by the jaws is smaller than the component lead, so that when the lead is inserted the latch is further extended, thus firmly holding the liner in place on the board.

5 Claims, 8 Drawing Figures

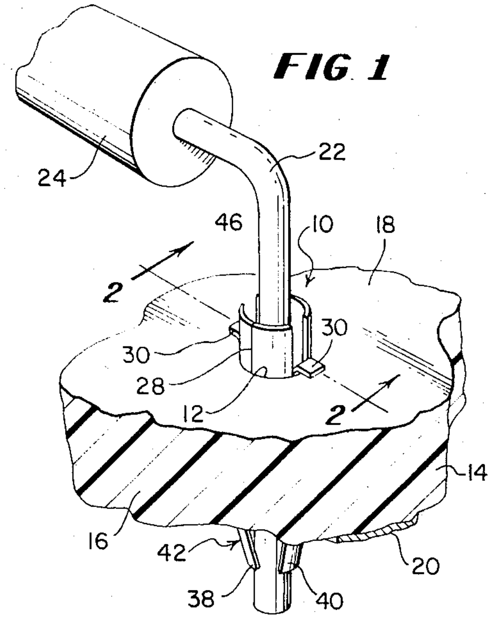
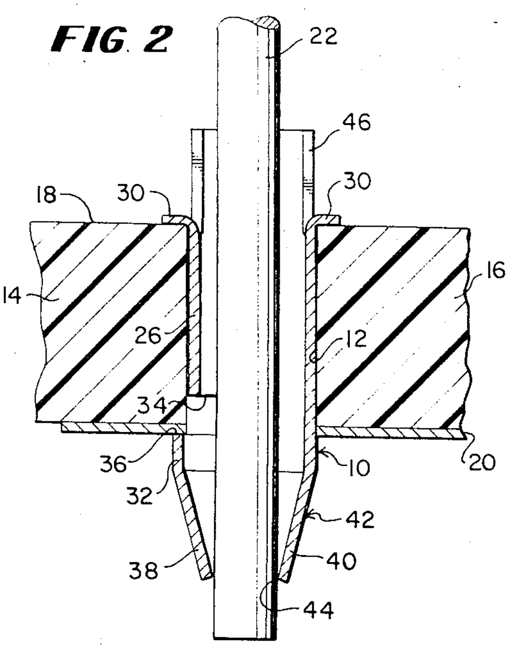
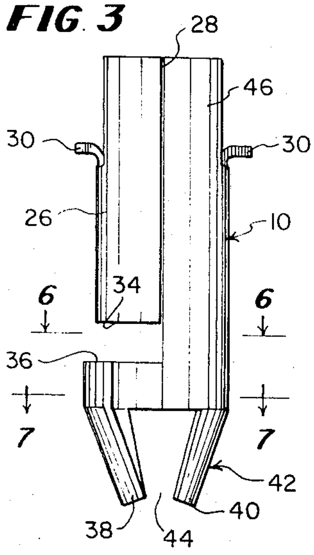
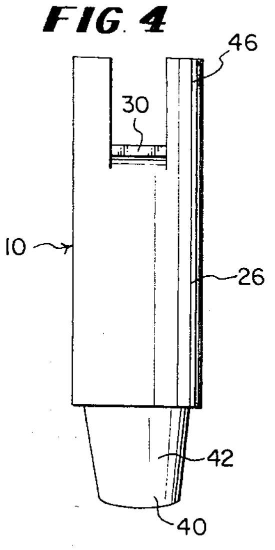
FIG. 5
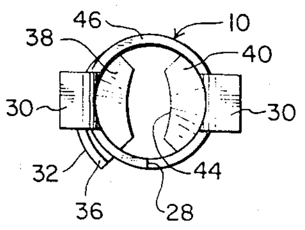
FIG. 6
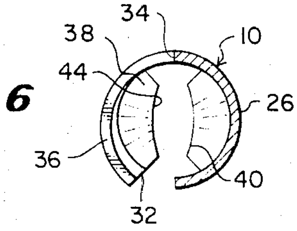
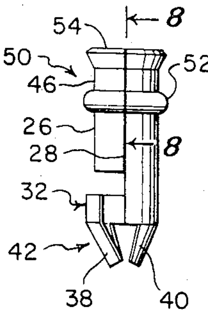
FIG. 7
FIG. 8
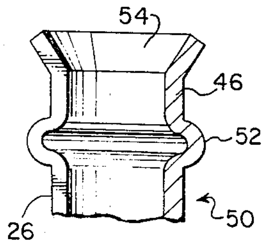

HOLE LINER FOR PRINTED CIRCUIT BOARDS

The present invention relates to a liner for holes in printed circuit boards.

In soldering the lead of a component to a printed circuit board, normally a lead receiving hole is formed in the board in a region where a conductive layer is present at one or both board surfaces. If no liner is used, certain problems are encountered. Firstly, the lead must be held in position in the hole until the soldering process is completed. In addition, the solder adheres only to the conductive surface area of the board and to a small part of the lead adjacent the board surface, so that a firm connection is difficult to obtain. Since the board substrate is nonconductive, the solder does not wick along the lead through the hole in the board, and flux can be trapped in the hole around the lead.

In order to overcome these difficulties, the use of printed circuit board hole liners has become widespread. A typical liner is a cylindrical metal sleeve inserted into the hole. A drive pin or punch located in registration with the hole is used to insert the liner. An upper stop limits insertion, and after insertion a tool is used to stake or flare the protruding lower end of the liner and prevent withdrawal. Resilient fingers extending inwardly from the liner wall grip an inserted component lead to hold it in position until the soldering operation takes place. In the soldering process, the solder wicks between the liner and the lead to provide large area adherence and to force trapped flux from the liner. Also, solder flows through and around the liner to bond the liner to the conductive surface or surfaces of the board.

Hole liners available heretofore have been unsatisfactory for a variety of reasons. The fragile inwardly projecting fingers have not been sturdy enough to hold the lead firmly against loosening due to vibrations or jarring prior to soldering. In addition, the process of mounting the liners including cumbersome loading and staking operations has been time consuming and expensive.

Among the important objects of the present invention are to provide an improved printed circuit board hole liner which is easily and economically installed, which firmly and reliably grips an inserted lead, which accepts a wide range of lead sizes, and which retains itself in a hole upon insertion without staking.

In brief, a hole liner constructed in accordance with the principles of the present invention may comprise a sheet metal blank formed to define a body having a barrel portion fitting in a hole in a printed circuit board and receiving a component lead to be inserted. Upper stops project from the barrel portion and engage the upper board surface to limit insertion of the liner. The lower end of the liner is provided with a plurality of inwardly converging fingers, the outer surfaces of which define an entrance bevel structure for facilitating entrance of the liner into the hole. The inner surfaces of the fingers define jaws for gripping and holding the inserted lead. A slot in the body defines a resilient latch member having an upwardly facing and outwardly displaced stop shoulder engaging the undersurface of the board upon insertion to prevent withdrawal of the liner. At least one finger is carried by the latch member so that during insertion of the liner into the hole, the latch member is resiliently moved inwardly, and when insertion is completed the latch member returns to its normal position to latch the liner in place. The gap or mouth defined between the lead gripping jaws is smaller than the lead to be inserted, so that upon insertion of the lead, the jaws are separated and the latch member is moved further outwardly positively to hold the liner in place.

The invention together with the above and other objects and advantages may be best understood from the following detailed description of the embodiments of the invention shown in the accompanying drawing, wherein:

FIG. 1 is a fragmentary perspective view of a hole liner constructed in accordance with the present invention in place in a hole in a printed circuit board and holding the lead of an electrical component in the preparation for a soldering operation;

FIG. 2 is an enlarged sectional view taken along the line 2—2 of FIG. 1;

FIG. 3 is a front elevational view of the hole liner of the present invention;

FIG. 4 is a side elevational view of the hole liner;

FIG. 5 is a top plan view of the hole liner;

FIG. 6 is a sectional view taken along the line 6—6 of FIG. 3; and

FIG. 7 is a front elevational view of a hole liner comprising an alternative embodiment of the invention; and FIG. 8 is an enlarged fragmentary sectional view taken along the line 8—8 of FIG. 7.

Referring now to the drawing, and initially to FIGS. 1–6, there is illustrated a hole liner generally designated by the reference numeral 10 embodying the features of the present invention. The liner 10 is inserted into a hole 12 formed in a printed circuit board 14 of conventional construction including an electrically insulating substrate 16 provided at one surface with a conductive metal layer 20 surrounding the region of the hole 12. The opposite surface 18 is illustrated as not including a conductive layer, but the liner 10 may, if desired, be used with the double-sided boards as well as single-sided boards. The liner 10 serves to receive and hold a lead 22 of an electrical component 24 so that a solder connection can be made by a conventional flow soldering or dip soldering process between the lead 22, the liner 10 and the conductive surface 20.

Preferably the hole liner 10 of the present invention is fabricated from sheet or strip metal stock in a series of blanking and piercing operations carried out by progressive die means. The metal body of the liner 10 is formed into a generally cylindrical barrel or sleeve portion 26 having abutting edges forming a seam 28 and dimensioned closely to be received within the hole 12 in the board 14.

In the orientation illustrated in FIGS. 1 and 2, the liner 10 is inserted into the hole 12 from above the board 14. THe upper portion of the liner is provided with a stop means which, in the case of the liner 10, take the form of a pair of upper stops or ears 30 sheared from the body of the liner. The ears 30 are engageable with the upper surface of the board 14 in order to limit insertion of the liner into the hole and to prevent the liner from passing completely through the hole.

In accordance with one feature of the invention, the liner 10 retains itself in the hole 12 upon insertion without the necessity for carrying out a staking operation or other operation on the lowermost end of the liner. In order to hold the liner in position, the body of the liner is provided with a resilient latch structure 32. As can best be seen in FIG. 3, the latch structure 32 is defined by a slot 34 struck from the body of the liner and including a horizontal segment forming a stop shoulder 36. The latch portion 32 of the body of the liner 10 is displaced radially outward so that, as best shown in FIG. 2, when the liner 10 is fully inserted the shoulder 36 engages the lower surface of the board 14 to prevent withdrawal of the liner.

The lowermost end of the liner 10 is provided with a pair of jaws 38 and 40 which, in accordance with an important feature of the invention, perform a series of functions in the installation and use of the liner 10. The jaws are tapered inwardly and downwardly, and the outer surfaces of the jaws form a tapered or beveled nose or entrance structure designated by the reference numeral 42. The beveled structure 42 allows easy entrance of the liner 10 into the circuit board hole 12, thus facilitating the operation of installing the liner.

In accordance with a further feature of the invention, one of the jaws, i.e., the jaw 38, is dependent from the resilient latch portion 32 of the body of the liner 10. One of the advantages of this arrangement is that the arcuate nature of the jaw 38 stiffens and strengthens the latch 32 and the stop shoulder 36. In addition, as the liner is placed in registration with the hole 12 and then forced downwardly, the jaws 38 and 40 engage the walls of the hole and are forced toward one another. In this manner, the latch 32 is cammed radially inwardly during insertion, and the liner is permitted readily to slide through the hole 12 until the stop shoulder 36 clears the lower surface of the printed circuit board. At this point, the resiliency of the metal causes the latch 32 to move outward to its initial position thereby to hold the liner 10 in place in the board.

After mounting of the liner 10 in the board 14, another important function of the jaws 38 and 40 comes into play. As can be seen from a comparison of FIGS. 2 and 5, the jaws 38 and 40 define a gap or mouth opening 44 having an initial size smaller than the size of the lead to be inserted. When the component lead 22 is inserted into the liner 10, it engages and forces apart the jaws 38 and 40, this separation being accommodated by the resilient nature of the latch 32. As a result, the lead 22 is firmly gripped between the tips of the jaws 38 and 40, and moreover the angular nature of these jaws provides a wedgelike force preventing withdrawal of the lead. The structure of the jaws is such that the jaws are not fragile or weak, and there is provided a reliable force capable of holding the lead and the component 24 in position throughout further assembly and manufacturing operations until a soldering operation is carried out.

Yet another important function of the jaws 38 and 40 can be appreciated at this point. When the lead 22 is inserted between the jaws, the outward separation of the jaws moves the resilient latch 32 outwardly even beyond its normal relaxed position. As a result, the stop shoulder 36 is moved out over the lowermost surface of the board 14. Thus, it can be seen that insertion of the lead serves to lock the liner 10 even more securely in position. Prior to insertion of the lead, the liner can be removed if desired by compressing the latch portion 32 inwardly while pushing the liner 10 upwardly. However, after insertion of the lead, removal of the liner is not possible.

The uppermost portion of the liner 10 is provided with an extending segment 46 projecting upwardly beyond the upper stop ears 30. This portion is of a size to permit the use of a template as the locating means in a vibratory loading system. Thus, the segment 46 is of a thickness equal to the thickness of the template. After loading of the liner 10 into a template by a conventional vibratory feeding operation, a flat platen may be used for pressing the liner into position. Thus, it is not necessary to use individual pins or punches to insert the liner 10.

Although the lead 22 and liner 10 are illustrated in FIGS. 1 and 2 without the presence of solder for clarity of illustration, it should be understood that the liner 10 is intended for temporarily holding the component and lead in position until soldering can be carried out. Such soldering may be accomplished with conventional flow soldering or dip soldering techniques, or otherwise. When the soldering operation is carried out, solder readily fills the interstices of the liner 10 and the spaces between the liner and the component lead 22. Since the liner 10 and the lead 22 are both metallic, the solder wicks along the liner through the thickness of the board to form a large area, reliable, low resistance solder bond between the conductive metal layer 20 and the liner and between the liner and the lead 22. In the course of this process, the solder forces all trapped flux from the region of the hole 12.

With reference now to FIGS. 7 and 8, there is illustrated a liner generally designated as 50 comprising an alternative embodiment of the invention. Liner 50 is similar in construction to the liner 10 in most respects, and identical reference numerals are used in connection with both liners to designate identical structure.

The upper stop means of the liner 50 is in the form of a rolled bead 52 encircling the body of the liner. The bead 52 is formed without severing the bead wall and also provides a more stable engagement with the upper board surface. The upper end of the liner is provided with a flared or chamfered lead in 54. This structure facilitates insertion of the component lead into the liner 50.

The liner of the present invention is quite versatile in that it is readily adapted to be used in a wide variety of installations. Although illustrated in connection with a board having a conductive surface on one side, it should be understood that the liner can be used where both surfaces of the board carry a conductive layer. Also, the jaws 38 and 40 can receive a wide variety of component lead sizes and accordingly the liner can be used with a wide variety of types of electrical components.

Although the invention has been described with reference to the illustrated embodiments, it should be understood that the invention is not limited to the details of the illustrated embodiments but rather is defined by the scope of the following claims.

What is claimed as new and desired to be secured by Letters Patent of the United States is:

1. A hole liner for lining a hole in a printed circuit board having upper and lower surfaces and for receiving a component lead to be soldered into place on the board, said hole liner comprising:

a unitary sheet metal blank formed into a generally cylindrical body having abutting edges forming a seam extending longitudinally of said body;

said body including a barrel portion of right circular cylindrical shape having an outside diameter generally equal to the board hole diameter and having an inside diameter larger than the component lead diameter;

means forming a rigid stop projecting radially outward from said barrel portion and engageable with a first surface of the board upon insertion of the liner into the board hole from the first surface of the board in order to limit insertion of said body into the board hole;

a slot of substantial width in the wall of said barrel portion extending from said seam in one direction around the circumference of the barrel portion for a distance approximately half the circumference of the barrel portion;

the portion of said barrel portion on the side of said slot opposite said rigid stop being displaced radially outward in a generally arcuate spiral shape to form a resilient latch arm spaced from said rigid stop by a distance at least as great as the board thickness;

the length of said latch arm being approximately half the circumference of said barrel portion, and the width of said latch arm being small relative to its length;

the edge of said latch arm closest to said rigid stop forming a substantially flat stop surface adapted to interface with and abut the second surface of the board upon insertion of the liner into the board hole;

a first jaw extending from the edge of the latch arm furthest from said rigid stop and having an inclined arcuate shape merging with said arcuate spiral shape of the latch arm for strengthening said latch arm;

the circumferential extent of said first jaw being smaller than the length of said latch arm, and said latch arm including a segment disposed between said first jaw and said barrel portion for permitting radial movement of said latch arm; and a second jaw similar to said first jaw and extending from said barrel portion of said body opposite said latch arm;

the outer surfaces of said jaws being inclined toward one another to engage the board upon entry of the liner into the board hole and to cam said latch arm radially inwardly to permit movement of the latch arm through the board hole, said latch arm returning to its initial position upon movement of the latch arm fully through the board hole to retain the liner in the board hole;

the ends of said jaws defining a lead receiving gap of smaller diameter than the component lead diameter for further radially extending the latch arm upon insertion of a component lead.

2. The hole liner of claim 1, said barrel portion extending upwardly above said rigid stop for a substantial distance.

3. The hole liner of claim 2, said rigid stop comprising a pair of ears struck from the barrel portion substantially at right angles to the axis of said barrel portion.

4. The hole liner of claim 2, said rigid stop comprising a bead in the wall of the barrel portion.

5. The hole liner of claim 2, the upper end of the body being formed into an outwardly flared chamfer.

* * * * *